Jan. 10, 1928.

F. S. CARR 1,656,036

FASTENER

Filed July 22, 1925

Inventor:
Fred S. Carr,
by Emery Booth Janney & Varney
Attys.

Patented Jan. 10, 1928.

1,656,036

UNITED STATES PATENT OFFICE.

FRED S. CARR, OF NEWTON, MASSACHUSETTS, ASSIGNOR TO CARR FASTENER COMPANY, OF CAMBRIDGE, MASSACHUSETTS, A CORPORATION OF MAINE.

FASTENER.

Application filed July 22, 1925. Serial No. 45,266.

This invention aims to provide improvements in separable fasteners.

In the drawings, which illustrate a preferred embodiment of my invention:—

Figure 1:
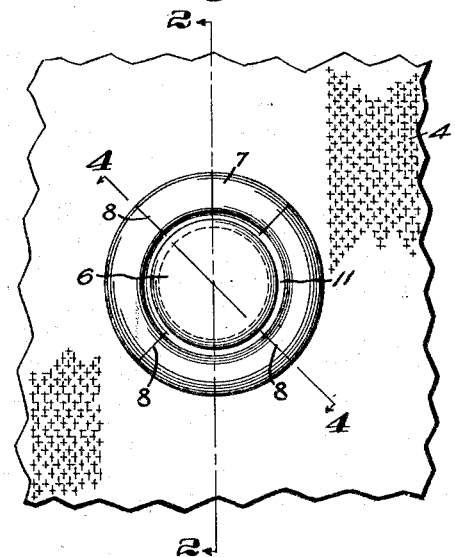
Figure 1 is an elevation view of the fastener as secured to a flexible carrying medium.

The drawings illustrate a stud and socket fastener peculiarly, though not exclusively, adapted for use on clothing and the like which is laundered by washing machinery. The fastener is rugged and relatively thin in construction and therefore is very well adapted to withstand the abuse of the laundry machinery.

The fastener includes a stud member 1 carried by a flexible carrying medium 2 and a socket having a stud-engaging body part or casing 3 formed in substantially the same manner as shown and described in my co-pending application Serial No. 45,265, filed herewith.

In this instance, the socket casing part is secured to a flexible socket-carrying medium 4 by a plurality of attaching prongs 5 which engage a cap or attaching member 6 comprising my invention. The cap presents a central domed portion 6 surrounded by an annular prong-receiving and prong-setting portion 7, generally curved in cross-section and provided with slits 8 which permit expansion and contraction thereof for purposes hereinafter described.

Figure 2:
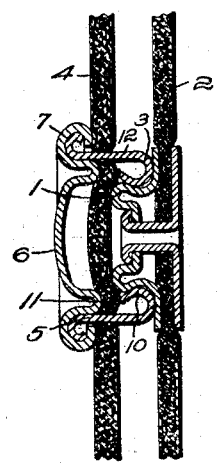
Fig. 2 is a section on the line 2—2 of Fig. 1.

The attaching prongs 5 extend from the outer rim of the stud-engaging part 3 and pass through the carrying medium 4, where they are bent outwardly and downwardly by the prong-setting portion 7 of the cap 6. The prongs follow the general contour of the inner face of the prong-setting portion 7, as best illustrated in Fig. 2, thereby securing both the cap 6 and the body part 3 of the socket to opposite sides of the socket-carrying medium 4.

Figure 3:
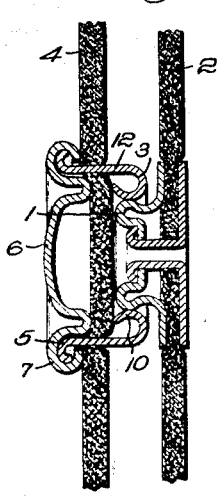
Fig. 3 is a section on the same line as Fig. 2, but showing the maximum expansion of the parts of the socket.

When the head 8 of the stud 1 enters the stud-receiving aperture 9 of the socket and engages the curved wall 10 surrounding the aperture 9, as illustrated in Fig. 3, the casing 3 and prongs 5 spread laterally to permit the head 8 of the stud to pass through the aperture 9. This spreading of the prongs could not readily take place if the prong-receiving portion of the cap were not resilient to permit expansion thereof, as illustrated in Fig. 3. Thus it will be seen that the casing 3 and prongs 5 spread laterally a-while during engagement and disengagement with the stud.

Figure 4:
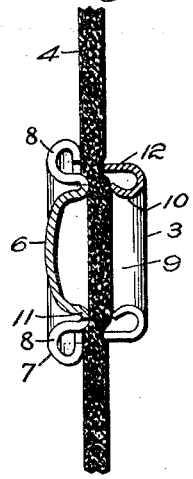
Fig. 4 is a section on the line 4—4 of Fig. 1, the stud being omitted.
Figure 5:
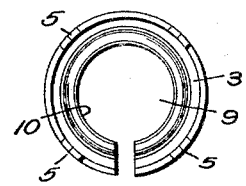
Fig. 5 is a plan view of the stud-engaging part of the socket.
Figure 6:
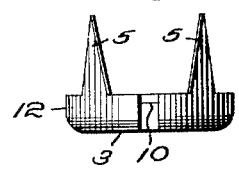
Fig. 6 is a side elevation of the socket part illustrated in Fig. 4.

By use of the above described means of attachment, it will be noted that the grip on the socket-carrying medium is between the annular depressed portion 11 of the cap and the upper edge of the outer peripheral wall 12 (Fig. 4) of the stud-engaging part 3, rather than between the prong-receiving part and the wall 12, as illustrated in the drawings of the above-mentioned co-pending application filed herewith. This method of gripping the carrying medium permits the resilient prong-receiving portion of the cap to expand and contract more easily than if the cloth were gripped as above referred to.

The claims in this application do not conflict with the broad claims of the above-mentioned co-pending application, but are confined to covering broadly and specifically the resilient attaching plate in its various combinations and also separately. None of the other applications filed by applicant on the same date as this application discloses structure which would support the claims of this application and therefore they do not conflict with applicant's other applications.

While I have shown and described a preferred embodiment of my invention, it will be understood that I have done so for clarification rather than limitation, my invention being best defined in the appended claims.

I claim—

1. A separable fastener socket including a resilient stud-engaging part and an attaching plate secured to opposite sides of a support, a plurality of prongs extending from said stud-engaging part through the support and engaged with said attaching plate, said stud-engaging part and attaching prongs being contractible and expansible as a whole, and an expansible and contractible prong-receiving portion presented by said attaching plate to permit said prongs to yield with said stud-engaging part during engagement and disengagement with a stud.

2. An attaching part for a separable fastener element including resilient clenching means for receiving and upsetting attaching means presented by the fastener element, said clenching means being contractible and expansible laterally to permit expansion and contraction of suitable attaching means of a fastener part which may be secured to a suitable carrying medium by said attaching part.

3. A separable fastener element having a plurality of attaching prongs for securing said element to a support, said prongs being yieldable laterally with said fastened element, and a prong-receiving part located at the opposite side of a fastener-carrying support, said prong-receiving part presenting resilient prong-deflecting means expansible and contractible with said prongs during expansion and contraction of said fastener element.

4. A separable fastener socket secured to a flexible socket-carrying medium by a plurality of attaching prongs and an attaching cap slit to provide resilient prong-deflecting means expansible and contractible to permit generally lateral shifting of said prongs relative to said cap while maintaining said socket in assembled relation with the carrying medium.

5. A separable fastener socket having a one-piece ring-like body part presenting a stud-receiving aperture and split to permit enlargement of said aperture for engagement of said body part with a stud, a plurality of attaching prongs presented by said body part and an attaching plate presenting resilient prong-receiving portions for co-operation with said prongs to secure said body part to a support, said resilient portions and said prongs being yieldable with said ring-like part during enlargement of said aperture.

6. A separable fastener socket including a one-piece resilient stud-receiving body part, a one-piece prong-receiving cap part presenting generally curved resilient prong-receiving portions and a plurality of attaching prongs presented by said stud-receiving part for securing said parts to opposite side of a socket-carrying medium, said resilient prong-receiving portions being expansible and contractible to permit lateral movement of said prongs during engagement of a stud with said stud-receiving part.

7. A separable fastener member comprising an expansible and contractible socket part, a socket-attaching part and means securing said parts to opposite sides of a carrying medium, said socket-attaching part having a portion adapted to expand and contract with the socket part when said socket part is engaged with or disengaged from a stud.

8. A separable fastener comprising an expansible and contractible snap fastener part, an attaching part presenting a resilient portion and means for securing said parts to opposite sides of a carrying medium, said attaching means, resilient portion of said attaching part and said snap fastener part being expansible and contractible together to permit engagement with and disengagement from a cooperating snap fastener part.

In testimony whereof, I have signed my name to this specification.

FRED S. CARR.